(12) United States Patent
Prieto et al.

(10) Patent No.: US 9,741,999 B2
(45) Date of Patent: Aug. 22, 2017

(54) LITHIUM-ION BATTERY

(71) Applicant: COLORADO STATE UNIVERSITY RESEARCH FOUNDATION, Fort Collins, CO (US)

(72) Inventors: Amy L. Prieto, Fort Collins, CO (US); James M. Mosby, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 152 days.

(21) Appl. No.: 14/316,574

(22) Filed: Jun. 26, 2014

(65) Prior Publication Data

US 2014/0374264 A1    Dec. 25, 2014

Related U.S. Application Data

(62) Division of application No. 12/391,197, filed on Feb. 23, 2009, now Pat. No. 8,795,885.

(Continued)

(51) Int. Cl.
*H01M 4/04*     (2006.01)
*C25D 9/08*     (2006.01)
(Continued)

(52) U.S. Cl.
CPC .......... *H01M 4/0452* (2013.01); *C25D 1/006* (2013.01); *C25D 3/58* (2013.01); *C25D 5/18* (2013.01);
(Continued)

(58) Field of Classification Search
None
See application file for complete search history.

(56) References Cited

U.S. PATENT DOCUMENTS 2,750,333 A * 6/1956 Smart ................. C25D 3/36
                                                    205/176
4,566,953 A * 1/1986 Kim ................... C25D 3/562
                                                   204/DIG. 9
(Continued)

FOREIGN PATENT DOCUMENTS

GB          760084 A  * 10/1956  .............. C25D 3/54
WO    2008089110 A1      7/2008

OTHER PUBLICATIONS

Cheng et al, "A study of electrodeposition of cobalt antimonides in citric based solutions", solid state phenomena, vol. 136, (2008) 75-82.*

(Continued)

*Primary Examiner* — Krishnan S Menon
(74) *Attorney, Agent, or Firm* — Samuel M. Freund; Cochran Freund & Young LLC

(57) ABSTRACT

A lithium-ion battery having an anode including an array of nanowires electrochemically coated with a polymer electrolyte, and surrounded by a cathode matrix, forming thereby interpenetrating electrodes, wherein the diffusion length of the Li$^+$ ions is significantly decreased, leading to faster charging/discharging, greater reversibility, and longer battery lifetime, is described. The battery design is applicable to a variety of battery materials. Methods for directly electrodepositing $Cu_2Sb$ from aqueous solutions at room temperature using citric acid as a complexing agent to form an array of nanowires for the anode, are also described. Conformal coating of poly-[Zn(4-vinyl-4'methyl-2,2'-bipyridine)$_3$](PF$_6$)$_2$ by electroreductive polymerization onto films and high-aspect ratio nanowire arrays for a solid-state electrolyte is also described, as is reductive electropolymerization of a variety of vinyl monomers, such as those containing the acrylate functional group. Such materials display limited electronic conductivity but significant (Continued)

lithium ion conductivity. Cathode materials may include oxides, such as lithium cobalt oxide, lithium magnesium oxide, or lithium tin oxide, as examples, or phosphates, such as LiFePO$_4$, as an example.

20 Claims, 3 Drawing Sheets

Related U.S. Application Data

(60) Provisional application No. 61/030,868, filed on Feb. 22, 2008, provisional application No. 61/083,764, filed on Jul. 25, 2008, provisional application No. 61/111,268, filed on Nov. 4, 2008, provisional application No. 61/116,162, filed on Nov. 19, 2008.

(51) Int. Cl.
| | |
|---|---|
| C25D 1/04 | (2006.01) |
| C25D 9/06 | (2006.01) |
| H01M 4/131 | (2010.01) |
| H01M 4/134 | (2010.01) |
| H01M 10/052 | (2010.01) |
| C25D 3/58 | (2006.01) |
| C25D 1/00 | (2006.01) |
| C25D 5/18 | (2006.01) |
| C25D 9/04 | (2006.01) |
| H01M 4/02 | (2006.01) |

(52) U.S. Cl.
CPC ........... *C25D 9/04* (2013.01); *C25D 9/08* (2013.01); *H01M 4/04* (2013.01); *H01M 4/0404* (2013.01); *H01M 4/131* (2013.01); *H01M 4/134* (2013.01); *H01M 10/052* (2013.01); *H01M 2004/021* (2013.01); *H01M 2004/024* (2013.01); *H01M 2004/025* (2013.01); *Y02E 60/122* (2013.01); *Y10S 977/762* (2013.01); *Y10T 29/49115* (2015.01)

(56) References Cited

U.S. PATENT DOCUMENTS

| 5,320,719 | A | 6/1994 | Lasbmore et al. |
| 5,874,185 | A | 2/1999 | Wang et al. |
| 2006/0216603 | A1 | 9/2006 | Choi |
| 2007/0059598 | A1 | 3/2007 | Yang |
| 2007/0200101 | A1 | 8/2007 | Asao et al. |

OTHER PUBLICATIONS

Mosby et al., "Direct electrodeposition of Cu2Sb for lithium-ion battery anodes", J. Am. Chem. Soc., 2008, 130, 10656-10661.*
Alloys of Antimony, "Williams Metals", downloaded from the internet on Oct. 19, 2015.*
Moss et al., "Sensitization and Stabilization of TiO2 Photoanodes with Electropolymerized Overlayer Films of Ruthenium and Zinc Polypyridyl Complexes: A Stable Aqueous Photoelectrochemical Cell," Inorganic Chemistry, 2004, vol. 43, pp. 1784-1792.
International Search Report for PCT/US09/034912, International Searching Authority, Apr. 17, 2009, pp. 1-9.

* cited by examiner

LITHIUM-ION BATTERY

RELATED CASES

The present application is a divisional of U.S. patent application Ser. No. 12/391,197 filed on Feb. 23, 2009, which claims the benefit of provisional patent applications: (a) Ser. No. 61/030,868 for "Electrodeposition of $Cu_2Sb$ For Li-Ion Batteries From Aqueous Solution At Ambient Conditions" by Amy L. Prieto et al., filed on 22 Feb. 2008; (b) Ser. No. 61/083,764 for "Three-Dimensional Lithium-Ion Battery With Nanoscale Dimensions" by Amy L. Prieto et al., filed on 25 Jul. 2008; (c) Ser. No. 61/111,268 for "Conformal Coating Of Nanowire Arrays Via Electroreductive Polymerization" by Amy L. Prieto et al., filed on 4 Nov. 2008; and (d) Ser. No. 61/116,162 for "Electrochemically Reduced Lithium-Ion Conducting Polymer Films Of Acrylates" by Amy L. Prieto et al., filed on 19 Nov. 2008, which provisional applications are hereby incorporated by reference herein for all that they disclose and teach.

STATEMENT REGARDING FEDERAL RIGHTS

This invention was made with government support under Contract No. ECS0709412 awarded by the National Science Foundation to Colorado State University. The government has certain rights in the invention.

FIELD OF THE INVENTION

The present invention relates generally to batteries and, more particularly to lithium-ion batteries.

BACKGROUND OF THE INVENTION

Lithium is the lightest and most electropositive element, making it well-suited for applications that require high energy density. As such, lithium-ion ($Li^+$) batteries have been successfully employed in a large variety of portable and other electronic devices. However, slow diffusion of $Li^+$ into the anode and the cathode, as well as slow diffusion between the two electrodes, remain the two principal limitations to the rates of charging and discharging for these batteries.

Nanostructured materials have been demonstrated to be useful for $Li^+$ batteries due to their high surface area-to-volume ratio, a property that has been shown to lead to greater reversibility for the lithiation reaction and greater discharge rates. Moreover, fabrication of nanowire arrays of both carbon-based anodes and several common cathode materials has been shown to enhance electrode performance because the reduction in particle size of the electrode materials, while maintaining electrical contact from grain to grain, reduces the distances the $Li^+$ ions must diffuse.

In particular, the charge/discharge rate of a battery is related to the rates of diffusion of $Li^+$ into each electrode and the rate of diffusion between the cathode and the anode. While nanowires have been shown to cycle faster than bulk materials, reducing the distance between cathode and anode battery structures has not been straightforward, and although nanostructured cathodes/anodes have previously been utilized in $Li^+$ batteries, this was done primarily to increase the surface area-to-volume ratio of either the cathode or anode or both, and the $Li^+$ diffusion distance remained, as a consequence, quite large as lithium ions were required to travel large distances between macroscopically separated electrodes.

SUMMARY OF THE INVENTION

Accordingly, it is an object of the present invention to provide a lithium-ion battery effective for increasing the diffusion rate of $Li^+$ between the battery anode and cathode.

Another object of the invention is to provide a lithium-ion battery effective for increasing the rate of diffusion of $Li^+$ into the battery anode and cathode.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the lithium-ion battery, hereof, includes in combination: an anode including electrodeposited structures having intermetallic composition effective for reversibly intercalating lithium ions, the structures being in electrical communication with a first electrode; a lithium-ion conducting solid-state electrolyte deposited on the structures of the anode; and a cathode material interpenetrating the space between the structures of the anode in electrical communication with a second electrode.

In another aspect of the invention, and in accordance with its objects and purposes, the method for producing a lithium-ion battery, hereof, including the steps of: forming an anode comprising electrodeposited structures having intermetallic composition effective for reversibly intercalating lithium ions, the structures being in electrical communication with a first electrode; depositing a lithium-ion conducting solid-state electrolyte on the structures of the anode; and interpenetrating the space between the structures of the anode with a cathode material in electrical communication with a second electrode.

In still another aspect of the invention, and in accordance with its objects and purposes, an electrode including electrodeposited structures having intermetallic composition.

Benefits and advantages of the present invention include, but are not limited to, providing a battery having nanoscale dimensions wherein the electrodes are interpenetrating, thereby significantly reducing the distance which the $Li^+$ ions are required to traverse upon charging/discharging of the battery over other types of lithium-ion batteries.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1B shows the step of placing a conformal coating of an electrolyte material onto the conducting structures shown in FIG. 1A hereof; and the step of interpenetrating cathode material between the anode structures in electrical connection with a second conductive substrate is shown in FIG. 1C.

DETAILED DESCRIPTION OF THE INVENTION

Figure 1A:
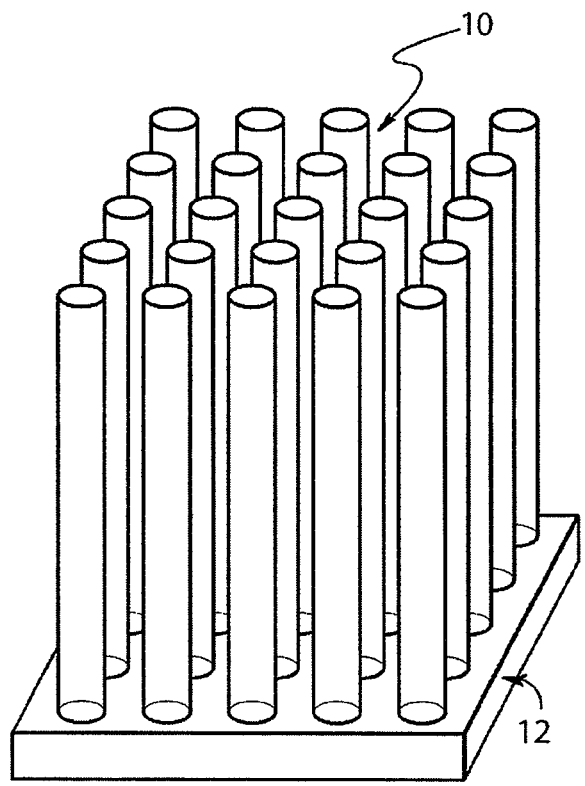
FIGS. 1A-1C illustrate a method for assembling the battery of the present invention, wherein the step of generating an anode including an array of conducting structures in electrical contact with a conducting substrate is shown in FIG. 1A.

Briefly, the present invention includes a lithium-ion (Li$^+$) battery having an anode comprising an array of nanowires electrochemically coated with a polymer electrolyte, and surrounded by, and in electrical communication with a cathode matrix, forming thereby interpenetrating electrodes, and a method for producing such batteries. The present battery architecture increases the diffusion rates of the Li$^+$ between the cathode and anode by reducing the Li$^+$ diffusion length between these two electrodes. Small, lightweight batteries having long lifetimes, and capable of rapidly discharging power may be constructed.

In accordance with embodiments the present invention, an array of high aspect-ratio nanostructures (such as nanowires, nanoribbons, nanotubes, and nanocones, as examples) having dimensions (for example, length) such that one dimension may be 10 to 1000 times larger than a smaller dimension (for example, the diameter of a wire) which may have nanometer-scale dimensions, may be formed on conductive, generally planar substrates. Nanorods, having an aspect ratio of less than 10 may also be formed. In what follows the term "nanowire" will be utilized as exemplary of "nanostructures."

Dendritic growth of metallic lithium onto the commonly used graphite anodes can lead to shorting in the battery and may cause safety issues. Therefore, new anode materials and morphologies are desired in which these safety issues, as well as the capacity and the charge/discharge rates, can be improved over graphite. Intermetallic compounds offer the possibility of improved capacity, a highly reversible reaction with lithium, and a lithium intercalation potential that may be less negative than the deposition potential of metallic lithium, the latter property being useful for eliminating dendritic growth of elemental lithium on the electrode. A drawback of using intermetallics as anode materials has been the irreversible loss in capacity during cycling due to large volume changes which result in pulverization of the electrode during cycling and, consequently, a loss of electrical contact between the anode and the remainder of the battery. Cu$_2$Sb is an intermetallic composition that does not exhibit large volume changes during the charging and discharging. Another benefit of Cu$_2$Sb is that its operating potential precludes lithium metal plating. The use of Cu$_2$Sb nanowires has an additional benefit in that electrodes having nanoscale dimensions generally provide immunity from pulverization resulting from large volume changes, even over electrodes having micron scale dimensions.

As will be described hereinbelow, Cu$_2$Sb may be directly deposited onto a conducting substrate with precise control of composition and thickness under mild conditions, and onto complex shapes and into deep recesses with excellent electrical contact without requiring post-annealing. Codeposition of Cu and Sb from aqueous solutions presents two challenges: the reduction potentials of Cu and Sb differ by approximately 130 mV in aqueous solutions, and the deposition of Cu is preferred at less negative potentials; and while antimony salts are soluble in acidic solutions, they precipitate in neutral aqueous solutions to form Sb$_2$O$_3$. The electrodeposition of Sb is not possible in acidic solutions because H$_2$ is formed from the reduction of H$_2$O, at less negative potentials than those required to reduce Sb$^{3+}$. Citric acid (C$_6$H$_8$O$_7$) may be used to keep Sb$^{3+}$ in solution in less acidic solutions and/or shift its reduction potential to less negative potentials. Citric acid has been used as a complexing agent in deposition solutions for copper and antimony separately, due to its three carboxylic acid groups and one hydroxyl group. The resulting complexation of the Sb$^{3+}$ by the citrate species in solution allows the pH to be raised without the formation of Sb$_2$O$_3$, and results in a widening of the electrochemical window of the solution and shifted toward more negative potentials.

The direct electrodeposition of the intermetallic composition, Cu$_2$Sb, from aqueous solutions containing the required stoichiometric amount of copper versus antimony (for Cu$_2$Sb) has been achieved using citric acid as a complexing agent, thereby increasing the solubility of antimony salts and shifting the reduction potentials of copper and antimony toward each other, and enabling the direct deposition of the intermetallic compound at room temperatures and at a pH=6. The electrodeposition was performed onto copper substrates resulting in a Cu$_2$Sb thin film that is homogeneous, stoichiometric and crystalline.

One embodiment of the present method utilizes anodic aluminum oxide (AAO) technology to form an array of channels in the alumina substrate. Cu$_2$Sb is deposited into the nanochannels at a single electrochemical potential. The intermetallic compound, Cu$_2$Sb, displays excellent properties for use as an anode in Li$^+$ batteries: (a) increased charge storage capacity; (b) increased charging and discharging rates; and (c) reduced hazard of plating lithium metal onto the anode. Other intermetallic compounds also display these properties and may function equally well as anodes. Once a suitable anode material is deposited into the nanochannels, the AAO template is removed using standard chemical techniques. The remaining array of nanostructures (Cu$_2$Sb nanowires, in the present case) functions as a nanostructured anode having a high surface area. The nanostructures generated may display a high aspect ratio, generally having dimensions on the order of a few nanometers to several hundred nanometers in diameter and tens of nanometers to several hundred micrometers in length.

An electrically-insulating polymer may then be deposited onto the anode, conformally coating the nanowires and serving as the battery electrolyte. The electrolyte's function is to allow passage of Li$^+$ while offering a high resistance to electrical conduction (i.e., the passage of electrons or electrical current). Although any insulating material capable of conducting Li$^+$ is suitable, it should be applied in a generally conformal manner as a very thin layer which does not significantly modify the nanowire shapes within the array. One example is an electrochemically deposited poly(pyridine)zinc polymer prepared from [tris(4-methyl-4'-vinyl-2,2'-bipyridine)Zn](PF$_6$)$_2$) using a reduction technique, although other insulating polymers could be deposited electrochemically or otherwise by procedures known to those skilled in the art (including polyethylene carbonate derivatives). The thickness and material of the electrolyte is chosen such that the electrolyte is substantially electrically insulating but the nanowire shape is not substantially distorted. An insulating material, which may be the same material as that used for the conformal electrolyte coating, but may be any other electrically insulating material, covers exposed surfaces of the planar conductive substrate. Typically, the thickness of the electrolyte may be between about one nanometer and about a few hundred nanometers.

A cathode material may be introduced such that the coated nanowires in the array are further covered, and electrical contact made with a second electrode. Any suitable Li$^+$ battery cathode material may be used with LiCoO$_2$, LiMnO$_2$, and Li$_2$SnO$_3$, or phosphates, as examples. Such materials may be deposited in a number of ways. A sol-gel method, to be described hereinbelow, permits uniform distribution of the cathode material into the coated nanowire array.

Intermetallic materials having similar crystal structures to their lithiated counterparts have been sought since, with both the parent and product crystal structure being similar, less rearrangement is needed during the charging and discharging of the material, thereby reducing the volume change. Copper antimonide is one such intermetallic, with the antimony atoms in a face center cubic array in both the parent and product crystal structures. The similarity in crystal structures leads to an overall volume change of 95% upon lithiating Cu$_2$Sb to Li$_3$Sb (compared to 300% for Sn). The improvement in cycle life of Cu$_2$Sb has been demonstrated, maintaining a capacity of 1914 mAh ml$^{-1}$ after 35 cycles. Further, nanowires of Cu$_2$Sb should be less prone to degradation during charging and discharging than graphite, because of the inherent properties of the material and the nanoscale dimensions of the wires.

Previous investigations into the battery performance of Cu$_2$Sb involved using slurries of the active material mixed with a binder and carbon black since the binder is used to attach the powder to an electrode, thereby making electrical contact, and allows the material to undergo significant volume change without losing electrical contact with the current collector. To reproduce this soft matrix, a thin layer of graphite was evaporated onto a copper substrate, and then Cu$_2$Sb was electrodeposited onto the graphite. The graphite acted as a "soft" interface, which accommodates the volume change of the Cu$_2$Sb while keeping the electrical contact to the substrate. A steady capacity of 200 mAhg$^{-1}$ was maintained, whereas in the case of Cu$_2$Sb on Cu the capacity falls dramatically during the first few cycles until it reaches a minimum of 24 mAhg$^{-1}$. The graphite was found to improve the reversible capacity by an order of magnitude. Cycling capacity was also investigated as a function of film thickness. As the film gets thinner, the capacity of the film has been found to be maintained for a greater number of cycles. Nanowires of Cu$_2$Sb are expected to have an even greater ability to maintain capacity upon repeated cycling since the micron thickness of the prepared films is greater than the radius of the nanowires. Moreover, strain due to volume changes is better accommodated in a nanowire where it is constrained only in the longitudinal direction, than in a film where the material is constrained in all three dimensions. Thus, electrode material degradation in lithium-ion batteries may be reduced by using nanoscale morphology since materials having small dimensions survive longer than bulk materials.

Figure 1B:
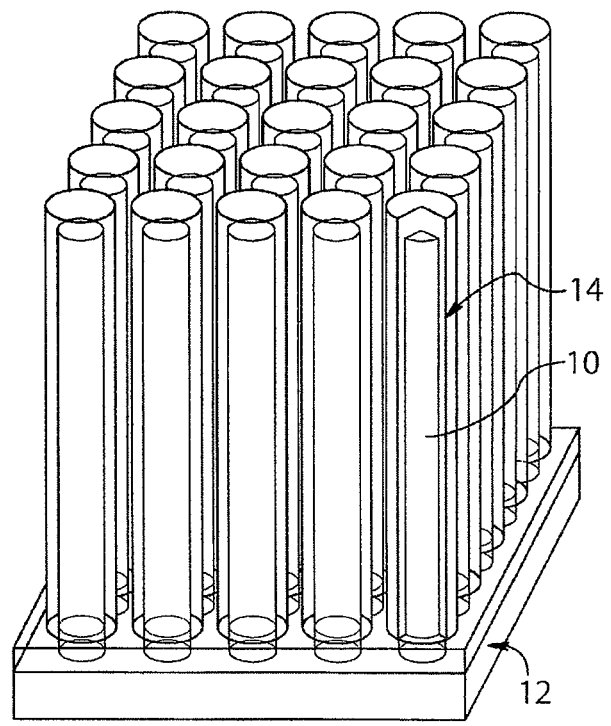
Figure 1C:
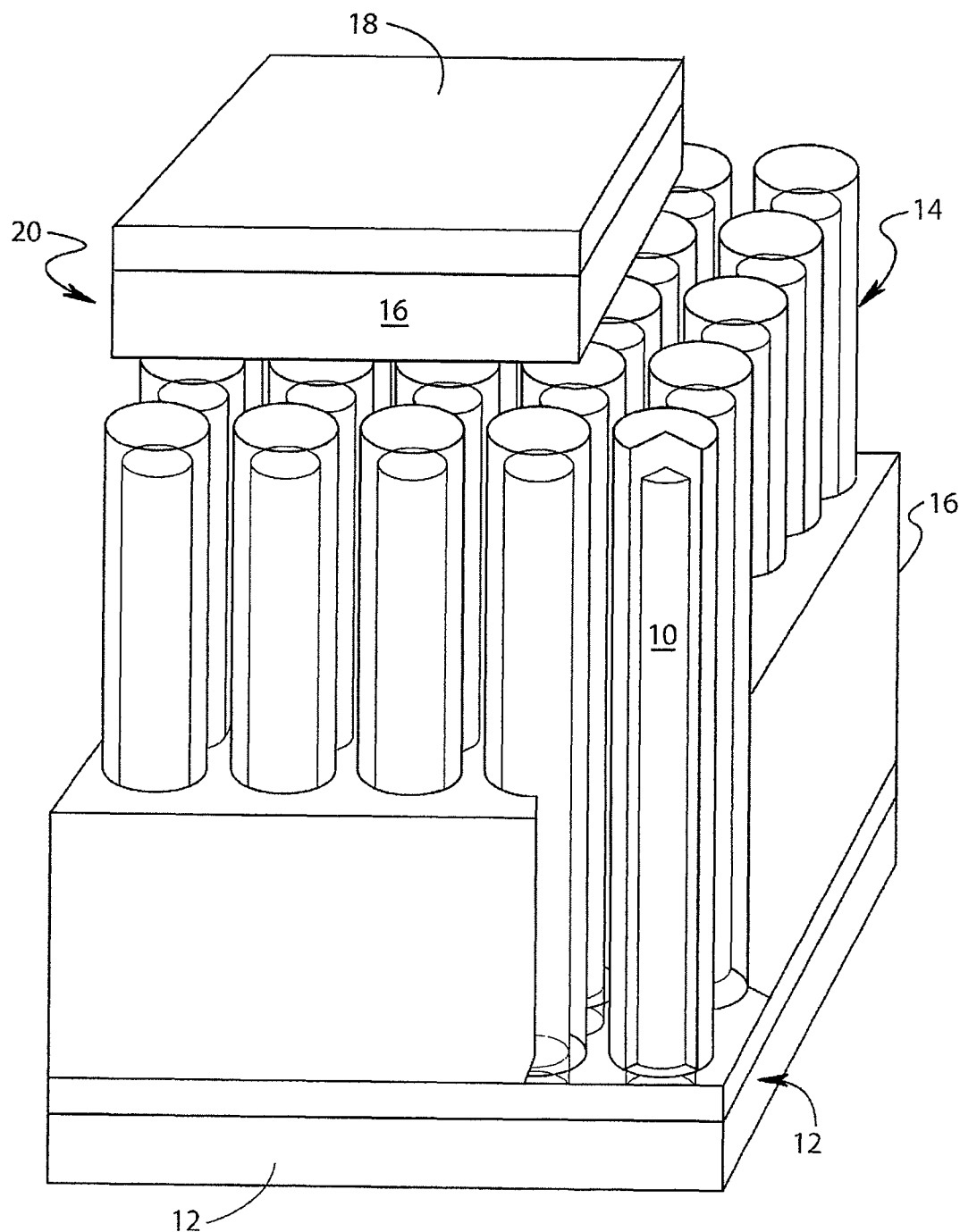

Reference will now be made in detail to the present embodiments of the invention, examples of which are illustrated in the accompanying drawings. In the Figures, similar structure will be identified using identical reference characters. Turning now to FIGS. 1A-1C a method for assembling the battery of the present invention is illustrated. An array of conducting nanowires, 10, in electrical contact with conducting substrate, 12, is shown in FIG. 1A. Electrolyte material, 14, is conformal coated onto conducting nanowires 10, as shown in FIG. 1B. Cathode material, 16, in electrical connection with a second conductive material, 18, is interpenetrated between electrolyte-coated nanowires 10, as shown in FIG. 1C, forming battery, 20.

Having generally described the invention, the following EXAMPLES provides additional details:

Example 1

Anode Preparation:

A. Cu$_2$Sb Films:

The direct electrodeposition of crystalline, stoichiometric Cu$_2$Sb films from aqueous solution at room temperature directly onto copper electrodes at a single potential is first described.

Cu$_2$Sb films were electrodeposited from aqueous 0.4 M citric acid solutions (denoted H$_3$Cit, 99.5+% Aldrich) containing 0.025 M antimony (III) oxide (Sb$_2$O$_3$, nanopowder, 99.9+% Aldrich), and 0.1 M copper (II) nitrate hemipentahydrate (Cu(NO$_3$)$_2$, 99.9+% Aldrich), prepared by adding the citric acid to Millipore water (18Ω) followed by the addition of Sb$_2$O$_3$. The complete dissolution of the Sb$_2$O$_3$ was aided by mechanical stirring after which the Cu(NO$_3$)$_2$ was added. The pH was then raised to 6 by the addition of 5 M potassium hydroxide (KOH, ACS certified, Fisher). The Cu$_2$Sb films were obtained by performing bulk electrolysis at room temperature at a potential of −1050 mV versus a saturated sodium calomel electrode (SSCE). The temperature and the potential were also systematically varied in order to find the optimal deposition conditions. Cyclic voltammograms (CVs) and depositions were conducted using a three-electrode cell and a potentiostat. Platinum gauze was used as a counter electrode, and a SSCE (0.236 V versus the standard hydrogen electrode) was used as the reference electrode. A platinum disk electrode (1.7 mm$^2$) or a glassy carbon electrode (7.0 mm$^2$) was used as the working electrode for the CVs, and copper or gold flag electrodes for the depositions. The copper flags were copper foil (0.25 mm thick, 99.98% Aldrich) with an area of 2-4 cm$^2$, and were mechanically polished using diamond paste and electrochemically polished in phosphoric acid (H$_3$PO$_4$, 85%, Mallinkrodt Chemicals) at a current of 0.15 A for less than 5 s. The gold substrates were made using a vacuum evaporator with a deposition controller. Approximately 10 nm of chromium was evaporated onto glass slides as an adhesion layer, followed by 300 nm of gold. Electrical contact was made by connecting a copper wire to the flags with carbon paint or with a clip. Clear nail polish was used to insulate the edges of the substrate and the back of the copper foil in order to ensure that deposition only occurred on flat surfaces with a controlled surface area. The depositions were carried out at a constant potential for 10 min. periods. The films were rinsed with Millipore water and allowed to air dry.

Citric acid is a triprotic acid; therefore, solutions of varying pH were examined using cyclic voltammetry to study the effect of pH on the copper and antimony deposition potentials. Solutions containing Cu(NO$_3$)$_2$, Sb$_2$O$_3$, and citric acid were made ranging from pH 1 to 8. The concentrations of Cu$^{2+}$ and Sb$^{3+}$ were 0.1 M and 0.05 M, respectively (before the addition of KOH). Cyclic voltammograms (CVs) were taken from pH 1 to pH 8, inclusively, using 0.1 M Cu(NO$_3$)$_2$ and 0.025 M Sb$_2$O$_3$ (i.e. 0.05 M Sb$^{3+}$) in 0.4 M citric acid taken using a SSCE reference electrode, a platinum working electrode, and with a scan rate of 250 mV/s.

In addition to significantly increasing the electrochemical window of the solution, raising the pH also controls which citrate species are present. Whereas at pH=1 the predominant species present for the citrate is the fully protonated species (denoted H$_3$Cit), at pH=6 there is a mixture of HCit$^{2-}$ and Cit$^{3-}$. Once the electrochemical window is extended toward more negative potentials, the difference between the reduction potentials of the metal species in solution is minimized at pH=6, which pH has the additional advantage that slightly acidic pH conditions preclude oxide precipitation during film deposition. A CV of the pH=6 solution was found to exhibit a large cathodic peak at −950 mV, which may be attributed to the reduction of a copper citrate dimer, followed by a shoulder located at −1150 mV corresponding to the reduction of $Sb^{3+}$.

The CV of citric acid alone exhibits two reduction peaks; one due to a surface phenomenon on Pt (at −118 mV) and one (at −750 mV) due to the reduction of a citrate species. As the pH is increased from 1 to 6, the CVs of each metal individually indicate that the $Cu^{2+}$ reduction peak shifts in the negative direction while the $Sb^{3+}$ reduction peak shifts in the positive direction. Deposition at a single potential (−1050 mV) results in the formation of $Cu_2Sb$. Upon switching the scan direction, a large oxidation peak is observed at 125 mV, corresponding to the stripping of $Cu_2Sb$. Only a single oxidation peak is observed, indicating that there is primarily a single oxidation process occurring at this potential. Thus, copper metal is not deposited when $Cu^{2+}$ alone is complexed by citrate at pH=6; however, in the presence of antimony citrate two reduction peaks are observed with the result that $Cu_2Sb$ is deposited.

An effective concentration of citric acid for the deposition solution was determined by varying the concentration between 0.2-0.8 M, in solutions containing 0.05 M $Sb^{3+}$ and 0.1 M $Cu^{2+}$ separately. As the concentration of citric acid was increased, the current of the copper cathodic peak decreased. This can be attributed to the equilibrium of the copper citrate complexes; that is, as more citric acid is added, the availability of free copper ions in solution decreases. No difference in the anodic or cathodic current was observed for the antimony solutions, although sufficient citric acid should be present to complex all the antimony in order to prevent the precipitation of $Sb_2O_3$. To avoid the precipitation of $Sb_2O_3$, forming 0.05 M $Sb^{3+}$ solutions, the minimum amount of citric acid needed was found to be about 0.4 M. Because lower concentrations of citric acid are desired for the copper deposition and at least 0.4 M citric acid is needed to keep $Sb^{3+}$ in solution, 0.4 M citric acid was determined to be an effective citric acid concentration. All solutions used for subsequent discussions contain 0.1 M $Cu(NO_3)_2$, 0.025 M $Sb_2O_3$, and 0.4 M citric acid adjusted to pH=6.

Using the solution conditions set forth hereinabove, an investigation of the deposition parameters was conducted. Films were deposited at different potentials surrounding the cathodic peaks: the five potentials chosen were −800 mV (the onset of the first cathodic peak), −900 mV, −1000 mV (the first peak maximum), −1100 mV (the onset of the second peak), and −1200 mV. Compositional results determined by X-Ray Photoelectron Spectroscopy, XPS, show that the ratio of Cu/Sb decreases with more negative potentials. Relative to the desired 2/1 copper/antimony ratio, copper-rich films are deposited at less negative potentials, and antimony-rich films are deposited at more negative potentials. The desired ratio was found for films deposited between −1000 and −1100 mV. This same trend was also observed in corresponding Energy-Dispersive X-Ray Spectra, EDS data.

X-Ray diffraction (XRD) patterns were used for phase identification of the films deposited at various potentials using solutions containing 0.1 M $Cu(NO_3)_2$, 0.025 M $Sb_2O_3$, and 0.4 M citric acid at pH=6. The Cu substrate is responsible for the high intensity of three peaks at 43, 50 and 74° 2θ, indexed to the copper (111), (200) and (220) reflections. Three additional peaks were observed in the XRD pattern of the film deposited at −800 mV. All three of these peaks match peaks for $Cu_2Sb$, one of which is generally used as the fingerprint for the desired compound (the broad (003) peak at 44° 2θ). The absence of additional $Cu_2Sb$ peaks and the copper-rich composition determined by XPS indicates that this film is a mixture of Cu, $Cu_2Sb$, Sb and/or a solid solution of Cu and Sb. Multiple $Cu_2Sb$ peaks appear in the XRD patterns of the films deposited at all other potentials, indicating more crystalline films. The XRD patterns of the films deposited at −900 and −1000 mV are similar, but the peaks of the film deposited at −1000 mV have higher relative peak intensities than the film deposited at −900 mV. Since all films were deposited for the same amount of time, the increased peak intensities may be due to increased crystallinity or simply greater growth rate. Although the Scanning Electron Microscope, SEM, images of these films also show similar surface morphologies, the film deposited at −900 mV shows larger features than the film deposited at −1000 mV. The grain sizes of the film deposited at −1000 mV are also smaller than the film deposited at −900 mV. As calculated by the Scherer method, the film grown at −900 mV is composed of grains that have an average size of 90 nm, while the average size of the grains of the film deposited at −1000 mV is 35 nm.

The morphologies of the films deposited at −1100 and −1200 mV are consistent with the differences between their XRD patterns and those of the films deposited at −900 and −1000 mV. An SEM image of the film deposited at −1100 mV, the pH=6 deposition solution containing 0.1 M $Cu(NO_3)_2$, 0.025 M $Sb_2O_3$ and 0.4 M citric acid, shows dendritic growth. The observed diameter of the rods was found to range from 50 to 150 nm with lengths greater than 600 nm. The average particle size calculated from peak broadening was 50 nm, corresponding to the smallest observed diameter from SEM. An SEM image of the film deposited at −1200 mV shows small spherical particles (200 nm) on the surface of the film with a calculated grain size less than 20 nm. XRD patterns of films deposited from −1100 to −1200 mV can be indexed for $Cu_2Sb$ and have the predicted relative intensities. In addition, orientation is observed to be a function of deposition potential: films deposited at potentials more negative than −1100 mV have (111) orientation versus the films deposited at −900 and −1000 mV, which exhibit (001) orientation.

No differences in $Cu_2Sb$ film composition were detectable by means of XPS for films deposited from 5 to 60° C. The broadness of the XRD peaks decreased with increasing temperature. Also, the surface morphology of $Cu_2Sb$ films deposited at 60° C. exhibited cubic faceting.

The presence of oxide phases or amorphous inhomogeneities in the as-deposited films was investigated. A film for which an XRD was recorded was annealed for 5 h under argon at 220° C. The peak positions observed in both XRD patterns match except that small peaks observed in the unannealed film are not present after annealing, which is consistent with the removal of surface oxide phases.

All films discussed thus far were deposited in 10 min. periods from unstirred solutions. Films having a thickness of 32.4 μm as determined by SEM on a cross-sectional image show no discontinuities or pores in a cross-sectional view. Excluding any nucleation time, this corresponds to an average deposition rate of 3.24 μm per minute, compared to an average of 0.72 μm per minute for the deposition of copper from a 0.2 M $CuSO_4$ solution at a constant current of 10 mA. The observed rapid growth rate indicates that the solution parameters or interaction of the metal precursors with the substrate may facilitate the electrodeposition of $Cu_2Sb$. To determine the importance of the substrate, films were also deposited on gold substrates. For these films the same solution parameters and deposition conditions were used. A film deposited on Au was slightly less crystalline than a film deposited on Cu, but still exhibited a (001) orientation, implying that the observed preferred orientation for films deposited at −1050 mV is not a result of templating by the substrate.

Preliminary battery testing experiments on electrodeposited $Cu_2Sb$ films show that the as deposited films intercalate Li reversibly. All films were charged and discharged at a rate of C/3, (where C corresponds to the rate needed to discharge an electrode in 1 h). The films were first charged between the open circuit potential (ocp) to a potential below that for depositing lithium metal (2 to 0.05 V vs. $Li/Li^+$). To reduce the degradation of the solid electrolyte interface, the films were then only discharged to 1.2 V vs. $Li/Li^+$. Subsequent cycles were run between 1.2 and 0.05 V vs. $Li/Li^+$. The consequences of the volume change (94%) that occurs during the change of $Cu_2Sb$ to $Li_3Sb$ were found to be significant during the first charge. The active material was observed to slough off from the copper substrates, indicating that mechanical degradation due to self-pulverization is a significant source of capacity loss. All active material was found to be removed from the copper substrate during the first ten cycles. A potential range of 1.4 to 0.65 V vs. $Li/Li^+$ was used to reduce the volume change (by 14%) by only partially charging the film to $Li_2CuSb$. This improved the capacity of the material for the first 5 cycles, but the copper substrate appeared bare by the tenth cycle. The tested films were thick (32.4 μm) which may have caused the faster degradation.

The structural transformations of $Mn_2Sb$ and MnSb are analogous to that of $Cu_2Sb$ during Li intercalation. In particular, MnSb has been shown to deliver a rechargeable capacity of 330 mAh/g. However, the lithiation of $Mn_2Sb$ proceeds directly to $Li_3Sb$ with very little LiMnSb formation, then cycles almost identically to MnSb, but with excess Mn present (as determined by in situ X-ray diffraction). Deposition of $Mn_2Sb$ in a manner similar to $Cu_2Sb$ was attempted. Analysis of CVs shows that as the pH is increased to 6 there is only a single distinct anodic peak present (at −1.2 V) due to the metal ions in solution (and not due to citric acid itself) before the onset of hydrogen evolution. Films deposited at pH=6 and −1.2 V indicate the codeposition of both metals, but not the intermetallic compound.

B. Pulsed Electrodeposition of $Cu_2Sb$ Nanowires:

Electrodeposition into templates (commercially available porous alumina oxide and polycarbonate templates) has been used to synthesize varies materials on a nanoscale with a wide range of applications. One surface thereof may be coated with a conducting metal such as gold using thermal evaporation, as an example, by first coating the surface with about 10 nm of Cr followed by about 200 nm of Au to which is attached a copper wire using silver paint. Nanowire material may then be electrodeposited into the pores, and the template dissolved leaving free-standing, well-ordered, equivalent-diameter nanowires. Removing the alumina template was accomplished, using both sodium hydroxide (1 M) and phosphoric acid (3 M). As will be set forth hereinbelow, similar templates may be used for creating nanowires of conducting metals such as copper, gold, or platinum for use as templates for analysis of electrolyte deposition.

Electrodeposition of $Cu_2Sb$ nanowires into porous alumina templates in accordance with the film deposition technology described in part A of this EXAMPLE 1, at a single potential, resulted in non-uniform filling of the pores, low density of filled pores and composition gradients over short distances within the wires. By contrast, using the same solution and potentiostatic pulse deposition, EDS spectral maps of the resulting wires exhibit a composition gradient which is uniform over large distances.

Figure 2:
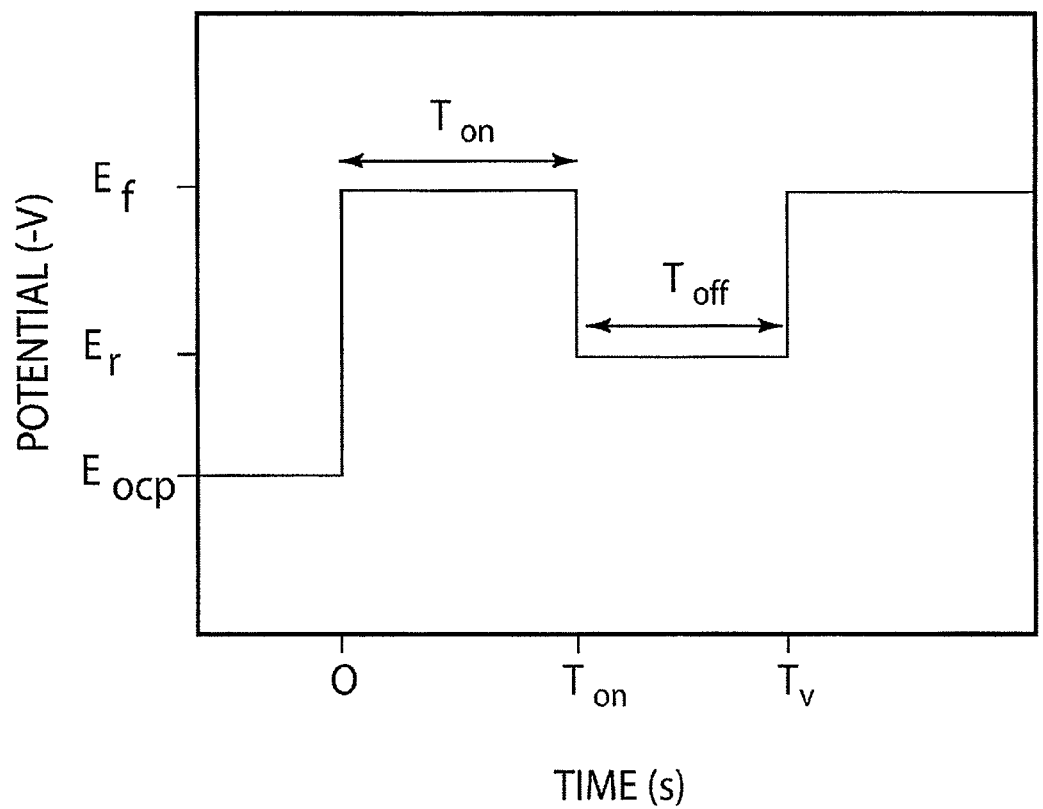
FIG. 2 illustrates a sample square wave effective for the pulsed electrodeposition of $Cu_2Sb$ wires, where the deposition potential ($E_f$) was the same potential as used in the electrodeposition of Cu$_2$Sb films (−1.05 V versus SSCE).

FIG. 2 illustrates a sample square wave effective for the pulsed electrodeposition of $Cu_2Sb$ nanowires, where the deposition potential ($E_f$) was the same potential as used in the electrodeposition of films (−1.05 V versus SSCE). In pulse deposition (pulse plating), there are two time parameters which may be controlled: the on time ($T_{on}$) and the off/reverse time ($T_{off}$). The concentration gradient established during $T_{on}$ dissipates during $T_{off}$. This should allow for more uniform wire growth and pore filling while limiting composition effects that are created by local concentration gradients established in the pores. The "quiet" potential ($E_r$), was varied to closely approach zero current, in order to stop the deposition for a sufficient length of time for the concentration gradient to dissipate without oxidizing previously deposited material. In FIG. 2, $T_v$ on the time axis represents the fact that $T_{off}$ may be varied to obtain the desired wire uniformity.

Preparation of the solutions for the pulse deposition of $Cu_2Sb$ thin films and nanowires is described in part A, hereinabove. All electrochemistry was performed with a ±10 V potential range with a ±250 mA current range and the ability to measure current on the tens of picoamperes; or with a ±2.4 V potential range and ±2 mA current range with the ability to measure current down to the 100 pA. The potentiostats were controlled using commercial software. Cyclic voltammograms (CVs) and depositions were conducted using a three-electrode cell. The pulse sequence will be discussed in detail in a latter section. Platinum gauze was used as the counter electrode, and a SSCE (0.236 V versus the standard hydrogen electrode) was used as the reference electrode. A platinum disk electrode (2.01 $mm^2$) was used as the working electrode for the CVs, and the copper or gold electrodes for the film depositions. The working electrodes for the film deposition were either copper or gold evaporated onto glass slides. The substrates were made using a vacuum evaporator with a deposition controller. Approximately 10 nm of chromium were evaporated onto glass slides as an adhesion layer, followed by 300 nm of copper or gold. Electrical contact was made by connecting a copper wire with an alligator clip.

Using pulse potentiostatic deposition, films were deposited using different time constants ($T_{on}$ & $T_{off}$) onto copper substrates. The TABLE sets forth the parameters and summarizes the results. Both $T_{on}$ and $T_{off}$ are considerably longer than needed to charge the double layer, created by the externally applied voltage, which exists at the electrode/electrolyte interface, and quickly dissipates. This allows any effects from charging of the double layer on the current or concentration to be neglected. It may be observed from the data that the potential found to give an approximately zero current was −0.525 V versus SSCE, which corresponds to the region of the CVs between the reduction peaks and the oxidation peaks. Films deposited with shorter $T_{on}$ times had diffraction peaks matching $Cu_{3.3}Sb$, while films deposited with longer $T_{on}$ times had diffraction peaks matching $Cu_2Sb$. Further, when the $T_{off}$ time was varied keeping the $T_{on}$ at 1.5 s the crystallinity of the $Cu_2Sb$ peaks increased with a decrease in $T_{off}$.

TABLE

Summary of parameters and results of pulse deposition of $Cu_2Sb$ films onto copper substrates; each range corresponding to five different values of the parameter.

| $T_{on}$ Ms | $T_{off}$ ms | $E_r$-V | $E_f$-V | Examined Parameter | Trend of Results |
|---|---|---|---|---|---|
| 5-50 | 15-15000 | −0.6 | 1.05 | Pulse period | Formation of $Cu_{3.3}Sb$ peak with long periods |
| 5-50000 | 15-150000 | 0.18 | 1.05 | Pulse period | Peaks matched $Cu_2Sb$ but with different orientations |
| 150 | 1500 | 0.45-0.525 | 1.05 | Dead potential | The best powder pattern was obtained with −0.525 V |
| 300-3000 | 1500 | 0.525 | 1.05 | $T_{on}$ | Short $T_{on}$ gave $Cu_{3.3}Sb$ and long $T_{on}$ gave $Cu_2Sb$ |
| 1500 | 150-7500 | 0.525 | 1.05 | $T_{off}$ | Peaks matched $Cu_2Sb$ with increased crystallinity with decreased $T_{off}$ |
| 150-7500 | 75-3750 | 0.525 | 1.05 | Pulse period | Shorter period gave oriented crystalline $Cu_2Sb$ (001) |

The data show that with longer $T_{on}$ times and shorter $T_{off}$ times, the best X-ray diffraction (XRD) patterns are obtained; however, the crystallinity is much lower than the films previously deposited using the unpulsed electrodeposition.

Example 2

ELECTROLYTE I: poly-[Zn(4-vinyl-4'-methyl-2,2'-bipyridine)$_3$](PF$_6$)$_2$

Electropolymerization is an effective method for creating conformal coatings without pinhole defects on high-area electrodes for batteries. The control of the thickness of the polymer layer may create an electrically resistive, ionically conducting barrier suitable for avoiding electrical shorts, inhomogeneous electric fields and inhomogeneous ionic diffusion rates. As will be described in this EXAMPLE 2, the electropolymerization of poly-[Zn(4-vinyl-4' methyl-2,2'-bipyridine)$_3$](PF$_6$)$_2$ results in the conformal coating of high aspect ratio nanowire arrays without the presence of pinhole defects. [Zn(4-vinyl-4' methyl-2,2'-bipyridine)$_3$](PF$_6$)$_2$ was chosen since: (a) the complex's metal-based oxidation, $Zn^{+2/+3}$, requires a high potential, making it an alternative to the well-studied redox active ruthenium and osmium analogs; (b) the large electroinactive window of the polymer enables the separation of the electrodes to prevent shorting; and (c) the electropolymerization of the zinc tris(vbpy) complex is a reduction-based polymerization achieved by applying a negative potential to inject electrons into the bipyridine rings. The syntheses of the ligand, 4-vinyl-4' methyl-2,2'-bipyridine (vbpy) and the zinc tris(vbpy) analogue are known. In a potential cycling polymerization using this material, the current response increases as polymer is deposited with each cycle. It is also observed that $Zn_{(m)}$ plating onto the working electrode occurs when potentials more negative than ~−1.70 V vs. SSCE are applied.

Atomic force microscopy, AFM, in contact mode was used to establish the thickness of the polymer films as a function of cycle number. Thickness was measured across scratches made in the polymer film with a razor blade. With a monomer concentration of 1 mM, and an electrode surface area of 0.1 cm$^2$, the thickness of the polymer film was found to vary linearly with cycle number up to twenty cycles. This correlation is not rigorous on nanowires due to the inherent differences in diffusion profiles when depositing on nanowires versus a planar electrode; however, it is a useful guide for estimating the number of cycle numbers required to achieve an approximate thickness. Polymer coatings deposited on both films and nanowire arrays were examined.

Films were made by thermal evaporation, while copper nanowire arrays were synthesized by electrodeposition of copper into porous anodic aluminum oxide (AAO). A thick layer of gold or copper was first evaporated onto one side of an AAO template, a copper wire was attached with silver paint, and the entire metal surface on the back of the AAO was painted with water insoluble, electrically insulating nail polish. Copper wires were then deposited in the AAO pores, and the alumina template was selectively dissolved away, resulting in free-standing wires. Since the nail polish used is soluble in acetonitrile (the solvent used in the electrochemical polymerization), in preparing the polymer-coated nanowires, the electrodes were constructed by placing the AAO on a strip of conducting ITO glass (13Ω) and the surrounding ITO covered with a non-conducting epoxy (TorrSeal) which is inert to acetonitrile. Scanning electron microscopy images of the copper wires before and after polymerization exhibit a uniform change in morphology for the coated wires versus the as-deposited nanowires; that is, the nanowires were all uniformly thicker after the deposition process. However, imaging techniques are insensitive to low numbers of defects.

Redox shut-off experiments were conducted with similarly synthesized platinum nanowires since this technique should be sensitive to pinholes in the polymer coatings. Redox activity of two species having different sizes and charges was investigated: the smaller, neutral ferrocene exhibits electroactivity on the polymer-coated electrodes, albeit significantly attenuated relative to each corresponding bare electrode, with a wave shape consistent with restricted diffusion ostensibly through the molecular-dimension pores of the polymer. By contrast, the redox activity of the larger, positively charged [Ru(2,2',2''-terpyridine)$_2$]$^{2+}$ species appears to be blocked on both the planar and nanowire electrodes coated with polymer. Additionally, to determine whether the polymer is acting as an ion exclusion layer, the voltammetric response of cobaltocenium was also measured and found to be similar to ferrocene. Electrochemical tests, coupled with the SEM micrographs indicate that a conformal layer of poly-[Zn(4-vinyl-4' methyl-2,2'-bipyridine)$_3$](PF$_6$)$_2$ is deposited on the surface of the nanowires. A micrograph of the entire length of a polymer modified copper nanowires, showed that the morphology and contrast is the same along the entire length of the nanowires, indicating complete coverage. The same polymer has also been shown to grow on and adhere well to copper, platinum, gold, and ITO surfaces. Therefore, it is expected that this polymer will deposit well on $Cu_2Sb$ nanowires.

X-ray photoelectron spectroscopy (XPS) was used to further confirm the presence of the polymer coating on both nanowires and films. The presence of the Zn 2p$_{3/2}$ and F 1s peaks were used as the fingerprints for the presence of the polymer, and representative peaks for each metal were probed on bare electrodes for comparison. Clear metal peaks are observed before coating, and a complete lack of the metal peaks were observed for polymer coated nanowires and films. Finally, a series of polymer-modified patterned ITO electrodes were tested to examine the breakdown voltage as a function of polymer thickness. A ~30 nm polymer layer electrodeposited on patterned ITO showed no appreciable current flow up to its breakdown bias of ~+3.5 V, which indicates that a thin polymer layer is electrically resistive over a large voltage window.

A. Synthesis of 4-vinyl-4'-methyl-2,2'-bipyridine and [Zn(4-vinyl-4'-methyl-2,2'-bipyridine)$_3$](PF$_6$)$_2$ The syntheses of the ligand and the zinc complex were both taken from literature. The purity was checked using $^1$H NMR before proceeding with electropolymerization experiments.

B. Copper and Platinum Nanowire Generation

Porous Anodic Alumina (AAO) templates were obtained from Whatman (100 nm pores, 13 mm circles) and 3-5 nm of chromium followed by 1-1.5 µm of copper (or gold) was evaporated on one side as a back electrode. Electrical contact was made to the evaporated metal by attaching a copper wire with colloidal silver paint (Ted Pella—isopropanol based). Nanowires were deposited in a three electrode cell, with a SSCE reference electrode, a platinum mesh counter electrode and the AAO working electrode. For copper, the 10 ml reaction solution consisted of 0.627 M CuSO$_4$ in 18Ω (Millipore) H$_2$O and 1 ml of concentrated H$_2$SO$_4$. The AAO working electrode was submerged in the reaction solution until the open-circuit potential (E$_{oc}$) remained constant over 5 min. The potential was held at 0.3 V below the E$_{oc}$ for 450 s to yield copper nanowires ~5 µm in length and 100 nm in diameter. The solution was stirred during the deposition (~100 rpm) to replenish reactants to the pores of the AAO template. Platinum nanowires were prepared in a similar manner, only the 10 ml deposition solution used was a 0.01 M H$_2$PtCl$_6$ solution with 1 ml of HClO$_4$ (70 wt %). The potential was cycled between +0.463 V and −0.237 V (vs. SSCE) at 0.05 V s$^{-1}$ for 60 cycles to yield platinum nanowires that were ~3.5 µm long and 100 nm in diameter.

C. Nanowire Electrode Fabrication

Once the nanowires were grown, the templates were removed from solution and thoroughly washed with distilled water and ethanol. The conducting back of the AAO electrode was then attached to the conducting side of ITO glass with water-based colloidal graphite (Aquadag, Ted Pella) and dried in vacuo for 2 h. Once dried, epoxy (TorrSeal), chemically inert in CH$_3$CN solutions, was used to cover both the AAO template and the ITO conducting glass so that only ~1 cm$^2$ area of the template was exposed. The epoxy was then left to dry in open air for 24 h, after which the electrode was immersed in aqueous 1 M NaOH at 50° C. for 1 h to release the nanowires. Copper and platinum nanowire electrodes were both synthesized in this manner.

D. Electropolymerization of [Zn(4-vinyl-4' methyl-2,2'-bipyridine)$_3$](PF$_6$)$_2$ Electropolymerization was achieved by utilizing a three-electrode Van Dyne cell where all oxygen was evacuated by bubbling acetonitrile-saturated nitrogen through the 0.1 M TBAPF$_6$/CH$_3$CN before polymerization. Additionally nitrogen was blown over the cell to minimize oxygen contamination. Oxygen evacuation was confirmed by taking a background cyclic voltamogramm between 0 V and −1.2 V vs. SSCE. In all cases, a platinum wire was used as a counter electrode and the reference electrode was a saturated sodium calomel electrode (SSCE). All electrochemical and solid-state electrical measurements were done on a CH Instruments 650 potentiostat/galvanostat.

E. Solid-State Linear Sweep Voltammetry

Electrical measurements performed on a nanometer thick layers were adapted from methods found in the literature. A Ga—In liquid metal eutectic (Sigma-Aldrich, used as received) was used to make contact to the bare and polymer covered ITO. Tungsten wire, pre-wetted by immersion into the Ga—In eutectic for 30 s, was then used to contact the liquid metal on the surface of the electrode. All solid-state electrical measurements were done in an N$_2$-filled glove-box and the bare ITO was positively biased.

F. Physical Characterization of Polymer Thin-Films, Nanowires and Polymer-Modified Nanowires Scanning electron microscopy (SEM) was utilized to characterize the nanowires, before and after polymer modification. The accelerating voltage of the electron beam was lowered to 3 keV during imaging of polymer films due to excessive charging of the non-conducting polymer. X-ray photoelectron spectroscopy (XPS) (Phi 6500) was used to characterize the surface of the different electrodes. Measurements were performed with an Electron Spectrometer for Chemical Analysis system and analyzed using commercial software. An Al monochromatic source operating at 350.0 W was scanned at an energy of 58.7 eV in intervals of 0.125 eV step$^{-1}$ over the range indicated on the spectra. High resolution XPS was performed using a signal to noise ratio of at least 100:1 for the films and 50:1 for the nanowires. The thickness and topography of the polymer films were analyzed using atomic force microscopy (AFM) (Alpha NSOM with contact mode capabilities) of the as deposited films on etched ITO substrates. Analysis of the topography was achieved on an 100 µm×100 µm area, and the height was determined using the scratch method: A clean razor was used to scratch through the polymer film to the ITO substrate and a depth profile of the scratch was taken from two scratches on three separate electrodes to yield the mean thickness and Error.

G. "Redox Shut-Off" Experiments

The complexes [Ru(2,2',2"-terpyridine)$_2$](PF$_6$)$_2$, [Co(cyclopentadienyl)$_2$](PF$_6$) and [Fe(cyclopentadienyl)$_2$] (Aldrich, used as received) were used to make a 10 mM solution in 0.1 M TBAPF$_6$\CH$_3$CN. The three electrode cell was comprised of a platinum mesh counter electrode, Ag/AgCl reference, and the stated working electrode. Cyclic Voltamogramms were taken at 0.05 Vs$^{-1}$.

Example 3

Electrolyte II: Acrylates:
The polymer films disclosed herein are useful as solid-state electrolyte materials for use in electrochemical cells, such as lithium-ion batteries. This is largely due to their high ionic conductivity and low electronic conductivity. These films are particularly useful in batteries with very small scale features (such as nanoscale) because they can be conformally deposited using an electroreductive polymerization method. This method results in good uniformity of film thickness without large numbers of pinholes and other defects, making the film of sufficient quality that the film is suitable for application as an electrolyte in a lithium-ion battery.

Reductive electropolymerization is well-known in the art, including the reductive polymerization of vinyl monomers. The first step in fabricating the films disclosed herein is to electrochemically reduce a vinyl monomer, in particular an acrylate-based monomer (including methacrylates, methacrylic acid, acrylic acid, acrylamide, methacrylamide, vinyl acetate and related), and specifically tetramethylammonium 3-sulfopropyl acrylate (TPASPP), lithium 3-sulfopropyl acrylate (LiSPP), and glycidal methacrylate (GYM). An advantage of GYM is that it contains heteroatoms (namely oxygen) that can assist in the conduction of lithium ions. An advantage of SPP-based films is that the presence of a covalently bound anion can assist in the conduction of lithium cations by virtue of offering a charge-compensating anion.

Electrochemical reduction of these monomers, under the appropriate conditions (e.g. supporting electrolyte, solvent, counter/auxiliary electrode, oxygen-free environment), will initiate the polymerization of these monomers. As radical propagation continues, a solid film will be deposited on the surface of the electrode as the polymer chain grows. The specific conditions employed may be used to determine the properties of the film (e.g. thickness, uniformity). Common techniques include stepping to a defined voltage and potentiometric cycling of the electrode. Reductive electropolymerization permits conformal deposition of polymeric films of controlled and generally uniform thickness onto an electrode surface with morphological features of either very small size (for example, nanoscale dimensions) and/or irregular or complex patterning. For batteries and other electrochemical cells, this technique may be used to generate films on nanowires, nanotubes, and related nanostructures which have been previously fabricated on the electrode surface (for example, $Cu_2Sb$ nanowires), when the electrolyte is required to be thin and conformal so that the battery cathode material can be deposited in and among the nanowires.

Once the film has been deposited, a "$Li^+$ doping" after treatment may be required to enable sufficient ionic conduction and to introduce lithium ion into the system. It is believed that the ionic conduction of polyGYM derives from etheral oxygens having a slight negative charge sufficient to attract $Li^+$ (similar to PEO doping). It has been observed by the inventors that when polyGYM is soaked in 1M $LiClO_4$ (in propylene carbonate, or PC) for 48 h, dip-rinsed, and the PC removed in vacuo at ~70° C., the polymer may be doped to form $LiClO_4$: polyGYM, as may be corroborated using high-resolution XPS. In the case of the SPP polymer, any film produced from monomers with cations other than lithium may require a cation exchange procedure (e.g. exchanging $K^+$ for $Li^+$, or $TMA^+$ for $Li^+$). Cation exchange is a technique well-known to those skilled in the art and may be accomplished in a number of ways, for example, the soaking procedure described above for polyGYM, perhaps repeated two or more times, would be expected to result in successfully ion exchange.

Acrylates are well known to deposit onto any electrically conductive surface. Therefore, the acrylates should readily deposit onto $Cu_2Sb$.

Example 4

Cathode Materials:

Materials found useful for large-scale lithium batteries including lithium cobalt oxide, lithium magnesium oxide, or lithium tin oxide, are expected to be effective for the present lithium ion battery. Although each of these materials has a theoretical capacity, the actual capacities of the bulk materials are much smaller (110 for cobalt, 150 for manganese, and 270 for tin). The capacities are expected to be greater when used on a nanoscale due to a higher surface area to volume ratio, and the greater ability of the nanowires to withstand the volume expansion and contraction that results in pulverization of the bulk materials. These materials were synthesized using a sol gel method in alumina templates. Such methods begin with dissolving precursors in solution. The space between the coated nanowires in the battery structure is filled with the solution. A slow reaction forming a sol occurs, the sol densifying in time to form a gel. Alcohol may be added to the solution, the ratio of water to alcohol in the initial solution being useful for controlling the gelation time of the sol. The gel is annealed at a chosen temperature to generate a powder which uniformly coats the nanowires. The second electrode may then be placed in electrical contact with the powder by a number of well-known methods, such as thermal evaporation of a metallic species, as an example. The thickness of the cathode material may be matched to the amount of lithium in the anode material.

1. Lithium Cobalt Oxide ($LiCoO_2$):

Equal molar quantities of lithium acetate (Aldrich, 99.99%) and cobalt (II) acetate (Aldrich, 98%) were mixed in a 4:1 molar solution of Ethylene glycol (Fisher Scientific, lab grade) and citric acid (Sigma-Aldrich, analytical grade). The solution was then heated to 140° C. for 5 h while stirring, until a pink gel was formed, to induce esterification, and then left to cool. The solution may be poured onto the nanorods or the nanorods may be dipped into the solution as it is becoming a gel over time, followed by a low-temperature anneal. The powdered materials may then be generated by heating the annealed gel to higher temperatures. Samples were prepared either on glass slides or on 100 nm sized porous alumina templates (Whatman Filters, anodisc 13, 0.1 µm) and placed in a vacuum at 60° C. for 1 h. For the templates this process was repeated multiple times to ensure proper filling of the pores. The samples were then placed in the oven and heated for 16 h to 550° C. with an increase in temperature of 0.3 to 1° C. per min. Porous alumina templates were employed to simulate high-aspect ratio structures, such as nanowires. At temperatures below 500° C. the pink/red samples created a glass like phase in which no powder was obtained; above 550° C., powders effective for use as cathode materials were generated.

2. Lithium Manganese Oxide (($LiMnO_2$ FCC, $Li_{0.82}$ [$Mn_{1.7}Li_{0.3}]O_4$ Monoclinic)):

Lithium manganese oxide was prepared in the same manner except that manganese (II) acetate (Aldrich, 98%) replaced the cobalt acetate. Samples were obtained on glass slides for the lithium manganese oxide gel. At temperatures below 200° C. the brown samples created a glass like phase in which no powder was obtained.

3. Lithium Tin Oxide ($Li_2SnO_3$):

Lithium tin oxide was prepared in the same manner except that tin (II) chloride (Sigma Aldrich, reagent grade) replaced the cobalt acetate. Samples were obtained on glass slides for the lithium tin oxide gel, all temperatures producing a white powder.

Phosphates such as LiFePO$_4$, as an example, may also be used, which may exhibit higher voltages and longer lifetimes than typical oxides. The lithium ferrous phosphate may be doped with cobalt, aluminum or magnesium.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for electrodepositing a homogeneous, stoichiometric, and crystalline coating of copper antimonide onto the surface of an electrically conducting substrate, comprising:
    preparing a solution having a chosen molar concentration of Cu$^{+2}$ and a chosen molar concentration of Sb$^{+3}$ in an aqueous solution of having sufficient citric acid present such that precipitation of the Sb$^{+3}$ does not occur;
    increasing the pH of the solution such that a mixture of HCit$^{2-}$ and Cit$^{3-}$ species is formed from the citric acid, and the difference between the reduction potential of the Sb$^{+3}$ to Sb and the reduction potential of Cu$^{+2}$ to Cu is minimized;
    applying a chosen negative potential to the electrically conducting substrate versus an inert electrode having a value such that stoichiometric Cu$_2$Sb is electrodeposited onto the substrate.

2. The method of claim 1, wherein the chosen molar concentration of Cu$^{+2}$ is twice the chosen molar concentration of Sb$^{+3}$.

3. The method of claim 1, wherein the concentration of citric acid is chosen to be the minimum concentration that will ensure dissolution of Sb$^{+3}$.

4. The method of claim 1, wherein the chosen negative potential is between about −0.8 V and about −1.2 V verses a saturated sodium calomel electrode.

5. The method of claim 4, wherein the chosen negative potential is approximately −1.05 V verses a saturated sodium calomel electrode.

6. The method of claim 1, wherein the chosen negative potential is continuously applied.

7. The method of claim 6, wherein the chosen negative potential is applied until a chosen mass of copper antimonide is deposited onto the substrate.

8. The method of claim 6, wherein the chosen negative potential is constant during the electrodeposition.

9. The method of claim 1, wherein the Sb$^{+3}$ is obtained from dissolution of Sb$_2$O$_3$.

10. The method of claim 1, wherein the Cu$^{+2}$ is obtained from dissolution of Cu(NO$_3$)$_2$.

11. The method of claim 1, wherein the chosen molar concentration of Sb$^{+3}$ is approximately 0.05 M.

12. The method of claim 11, wherein the chosen concentration of citric acid is between about 0.2 M and about 0.8 M.

13. The method of claim 12, wherein the chosen concentration of citric acid is about 0.4 M.

14. The method of claim 11, wherein the pH of the solution is approximately 6.

15. The method of claim 1, wherein the electrically conducting substrate has a surface comprising complex shapes.

16. The method of claim 1, further comprising a post-electrodeposition annealing step.

17. The method of claim 1, wherein the chosen negative potential is pulsed during the electrodeposition.

18. The method of claim 17, wherein duration and duty cycle of the pulses are separately controlled.

19. The method of claim 18, wherein the pulse duration is between about 5 ms and about 50,000 ms.

20. The method of claim 18, wherein the duty cycle of the pulses is between about 1% and about 99%.

* * * * *